3,235,561
**METHOD FOR PREPARING PERFLUORO-
(N-METHYL PYRROLIDINE)**
Robert N. Haszeldine, Disley, Ronald E. Banks, Burnage, Manchester, and Wai Ming Cheng, Timperley, England, assignors to Pennsalt Chemicals Corporation, Philadelphia, Pa., a corporation of Pennsylvania
No Drawing. Filed Mar. 5, 1963, Ser. No. 262,837
Claims priority, application Great Britain, Mar. 9, 1962, 9,240/62
2 Claims. (Cl. 260—313)

This invention relates to a method for the preparation of perfluorinated N-heterocyclic compounds by the pyrolysis of undecafluoropiperdine and relates also to the new compound perfluoro(N-methylpyrrolidine) which may be prepared by this method.

In the co-pending application of Robert N. Haszeldine et al., Serial No. 95,476, filed March 14, 1961, for Fluorinated Compounds and Method for Preparation the pyrolysis of undecafluoropiperdine at sub-atmospheric pressures of e.g. 1 mm. Hg in the presence of a defluorinating metal to produce good yields of pentafluoropyridine is described.

It has now been found that if the pyrolysis of undecafluoropiperdine is carried out at higher pressures, instead of pentafluoropyridine, the principal products obtained are the N-heterocyclic compounds perfluoro-2,3,4,5-tetrahydropyridine having the structure:

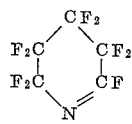

and the compound perfluoro(N-methylpyrrolidine) having the structure:

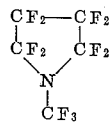

together with perfluoro(n-butylidenemethylamine),

$CF_3CF_2CF_2CF=NCF_3$

The second compound named above, viz. perfluoro(N-methylpyrrolidine) is a new N-heterocyclic compound having extraordinarily high chemical and thermal stability equivalent to that displayed by perfluorocarbons. A liquid boiling at 36.4° C., it is useful in many applications when this combination of properties is desired.

While the invention is not limited to, and does not depend upon, any particular reaction mechanism, it is believed that the compound perfluoro-2,3,4,5-tetrahydropyridine is produced by the selective defluorination of the precursor undecafluoropiperdine, while the compound perfluoro(N-methylpyrrolidine) is produced by an isomerization of the precursor undecafluoropiperdine with the original six membered piperidine ring structure rearranging to a five membered pyrrolidine ring with an N-perfluoromethyl group.

Generally speaking, the method of the invention is carried out simply by heating undecafluoropiperdine at pressures of at least about 500 mm. Hg absolute. Preferably, pressures of one atmosphere absolute (i.e. normal atmospheric pressure) or more will be used. Generally, the reaction is best carried out at pressures of from one to ten atmospheres absolute, with pressures of from one to three atmospheres absolute being preferred from the standpoint of convenience.

The reaction may be carried out batchwise by heating undecafluoropiperdine in a sealed autoclave or continuously by passing vapors of perfluoropiperdine through a heated reactor, most conveniently a heated tube. In the heated tube procedure, it is often advantageous to dilute the undecafluoropiperdine vapors with an inert gas such as nitrogen. In this manner, the residence time of the undecafluoropiperdine in the heated tube can be controlled with more accuracy.

A somewhat different product distribution is obtained depending up on whether the pyrolysis is carried out in the presence of a metal, such as iron, capable of acting as a fluorine acceptor under the reaction conditions and thus forming a metal fluoride, or whether, on the other hand, it is carried out in the absence of such a metal. If for example, the pyrolysis reaction is carried out in a steel tube or autoclave, and/or is carried out in a reaction vessel which is packed with a metal capable of acting as a defluorinating agent, higher yields of the compound perfluoro-2,3,4,5-tetrahydropyridine will be obtained and correspondingly lower yields of the compound perfluoro(N-methylpyrrolidine). If on the other hand, the reaction is carried out in the absence of such a defluorinating metal, such as, for example, in a heated tube or autoclave composed of, or lined with, an inert material (i.e. a material essentially unreactive with undecfluoropiperidine at reaction conditions) such as platinum, graphite, or silicon carbide or the like, smaller yields of perfluoro-2,3,4,5-tetrahydropyridine are produced with correspondingly higher yields of the compound perfluoro(N-methylpyrrolidine).

Thus, where it is desired to maximize the production of perfluoro-2,3,4,5-tetrahydropyridine, the reactor will be composed of, or lined with, a metal such as steel, nickel or the like capable of acting as a fluorine acceptor under the reaction conditions, or it will be packed with metals capable of so acting such as iron, mercury, nickel, cobalt, manganese, copper, silver, zinc, magnesium, aluminum, chromium, lead or titanium, preferably in a form which exposes a relatively large surface to the undecafluoropiperidine reactant.

The pyrolysis will be carried out at temperatures generally ranging from 200° C. to 900° C., preferably within the range of about 400° to 700° C. Temperatures of from 450° C. to 650° C. give particularly good results from the standpoint of good yields and conversions at reasonable contact times.

The contact time or residence time in the heated pyrolysis zone is adjusted in relation to the temperature to provide the desired conversions. Generally, the contact time to produce a given conversion will decrease with increasing temperature. Generally speaking, contact times ranging from about one minute to several hours (e.g. up to five hours) may be employed. The contact time will more usually range from about five to sixty minutes, and at preferred temperatures of from 450° to 650° C., particularly good results will be obtained at contact times of from about ten to thirty minutes.

The new compound perfluoro(N-methylpyrrolidine) prepared in accordance with the invention is a colorless liquid having a boiling point of 36.4° C. at atmospheric pressure. This compound despite the hetero atom (viz. nitrogen) in the ring, exhibits a degree of chemical and thermal stability equivalent to that displayed by perflorocarbons. For example, it is unaffected by prolonged treatment with hot concentrated acids or alkalis; it is unreactive with hot iron or copper at 500° C.; does not react with aqueous potassium iodide; and must be fused with sodium or potassium at 600° C. to convert it into alkali metal fluoride and cyanide for analytical purposes.

In contrast, closely related compounds such as perfluoropyrrolidine

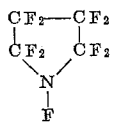

are much more reactive. Perfluoropyrrolidine for example, is readily defluorinated by contact with iron at 500° C. to yield the unsaturated compound

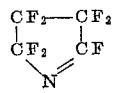

and will react with aqueous potassium iodide at room temperature to yield perfluorosuccinic acid. Other halogen substituted pyrrolidines likewise lack the extraordinary chemical and thermal stability of perfluoro(N-methylpyrrolidine) as, of course, does N-methylpyrrolidine itself.

The extraordinary chemical and thermal stability of perfluoro(N-methylpyrrolidine) makes it ideally suited for use as an inert solvent or diluent in reactions involving strong chemical reagents which would attack ordinary solvents such as in reactions involving the use of elemental fluorine or high valency metal fluorides such as $UF_6$, $CoF_3$, $AgF_2$ or $ClF_3$, or in reactions involving the use of hot acids or alkalis. These properties also make it highly useful as a heat exchange fluid or as a gyroscope fluid or hydraulic fluid particularly in applications where exposure to reactive chemicals is involved. These same properties together with its boiling point and vapor pressure make it an excellent blowing agent e.g. for polyurethane foams or as an additive to aerosol propellant mixtures particularly where chemical inertness is essential such as in aerosol propellants for foodstuffs. It is also useful as a liquid and/or vapor dielectric, e.g. for transformers or as a medium for particle detection in atomic physics.

The other N-heterocyclic perfluorinated compound prepared by the process of the invention, viz. perfluoro-2,3,4,5-tetrahydropyridine is a colorless liquid having a boiling point of 40.7° C. at atmospheric pressure. This compound is useful for example, as an intermediate for the production of hexafluoroglutaric acid by hydrolysis with aqueous sodium hydroxide.

The following examples illustrate several specific embodiments of the invention:

*Example 1*

This example illustrates a procedure in which the pyrolysis reaction is carried out in the absence of a defluorinating metal whereby perfluoro(N-methylpyrrolidine) is obtained as the major product with only minor amounts of perfluoro-2,3,4,5-tetrahydropyridine. The pyrolysis reactor is a platinum tube 100 centimeters long having an internal diameter of 1 centimeter and heated to 550° C. over 56 centimeters of its length. Through this tube 12.0 grams of undecafluoropiperidine is passed at the rate of 0.75 gram per hour at atmospheric pressure. The undecafluoropiperidine vapors are carried through the tube in a slow stream of nitrogen, the nitrogen-undecafluoropyridine mixture being produced by bubbling nitrogen through liquid undecafluoropyridine at a temperature of 0° C. The contact or residence time of the vapors in the heated zone is about 14 minutes. From this reaction 10.1 grams of material is recovered which is separated by distillation and gas chromatography into the following fractions:

(a) 1.5 grams of a mixture of tetrafluoromethane, hexafluoroethane, perfluoro(methylenemethylamine), carbonyl fluoride and silicon tetrafluoride, the last two materials arising from attack of the hot material on the glass trapping system at the exit of the platinum tube.

(b) 2.4 grams of unchanged undecafluoropiperidine.

(c) 4.0 grams of an approximately equimolar mixture of perfluoro(N-methylpyrrolidine) and perfluoro(n-butylidenemethylamine). This fraction is shaken for thirty minutes with 40 milliliters of 2 N sodium hydroxide solution to destroy the perfluoro(n-butylidenemethylamine). Two grams (21% yield based on reacted undecafluoropiperidine) of unchanged perfluoro-(N-methylpyrrolidine) having the structure shown above is recovered and dried over phosphorus pentoxide. The boiling point of this compound is found to be 36.4° C. at atmospheric pressure by vapor pressure measurements and the structure is confirmed by nuclear magnetic resonce spectroscopy. This compound is analyzed with the following results:

Calculated for: $C_5F_{11}N$; C, 21.2%; N, 4.95%; molecular weight, 283. Found: C, 21.4%; N, 5.2%; molecular weight, 280.

(d) 0.5 gram (5% yield) of perfluoro-2,3,4,5-tetrahydropyridine having the structure shown above and having a boiling point of 40.7° C. at atmospheric pressure by vapor pressure measurements. The structure of this compound is confirmed by infrared and nuclear magnetic resonance spectroscopy. Its structure is further confirmed by its hydrolysis with aqueous sodium hydroxide to produce hexafluoroglutaric acid. This compound is an analyzed with the following results:

Calculated for: $C_5F_9N$; C, 24.5%; N, 5.7%; molecular weight, 245. Found: C, 24.5%; N, 5.7%; molecular weight, 245.

*Example 2*

Following the procedures of Example 1 undecafluoropiperidine vapors in a slow stream of nitrogen are passed through a platinum tube of the same dimensions as in Example 1 but heated to a temperature of 700° C. over 56 centimeters of its length, with the contact time reduced to about 6 minutes. A good yield of perfluoro(N-methylpyrrolidine) is obtained with small amounts of perfluoro-2,3,4,5-tetrahydropyridine.

*Example 3*

This example illustrates the results obtained when the pyrolysis reactor is composed of a metal, in this case mild steel, which acts as a fluorine acceptor. The pyrolysis reactor is a mild steel tube 100 centimeters long having an internal diameter of 0.75 centimeter and heated to 500° C. over 56 centimeters of its length. Through this tube there is passed 3.0 grams of undecafluoropiperidine carried in a slow stream of nitrogen at the rate of 0.5 gram per hour at atmospheric pressure. The contact or residence time of the undecafluoropiperidine vapors in the heated zone is about 13 minutes. From this reaction there is recovered 2.74 grams of pyrolysate and this is separated by distillation and gas chromatography to provide 1.76 grams (68% yield) of perfluoro-2,3,4,5-tetrahydropyridine and 0.9 gram (30% yield) of an approximately equi-molar mixture of perfluoro(N-methylpyrrolidine) and perfluoro(n-butylidenemethylamine). This mixture is treated with a sodium hydroxide solution as in Example 1 to permit the recovery of the perfluoro-(N-methylpyrrolidine) in about 15% yield.

*Example 4*

Using the same procedures and the same equipment as in Example 3, except that the temperature is reduced to 350° C. and the contact time increased to 40 minutes, similar results are obtained.

*Example 5*

This example illustrates a procedure for carrying out the pyrolysis in a sealed autoclave which is packed with a defluorinating metal in finely-divided form.

The pyrolysis reactor is a steel autoclave having a volume of 730 ml. and packed with 250 grams of mild steel wool. The autoclave is evacuated and charged with 28 grams of undecafluoropiperidine. The autoclave is then sealed and heated at 500° C. under a pressure of two atmospheres for one and one-half hours. Twenty grams of product is obtained which is separated by distillation and gas chromatographic techniques to provide 9.7 grams (40% yield) of perfluoro-2,3,4,5-tetrahydropyridine and 7.3 grams (26% yield) of an equi-molar mixture of perfluoro(N-methylpyrrolidine) and perfluoro(n-butylidenemethylamine). This mixture is treated with aqueous sodium hydroxide as described in Example 1 to destroy the latter compound permitting the recovery of the perfluoro(N-methylpyrrolidine) in about 13% yield.

*Example 6*

Using the same procedures, equipment and conditions as in Example 5, undecafluoropiperidine is heated in an autoclave in the presence of thin strips of nickel with results similar to those described in Example 5.

*Example 7*

Using the procedures, equipment and conditions as in Example 5, undecafluoropiperidine is heated in a sealed autoclave in the presence of thin strips of magnesium. A product distribution similar to that described in Example 5 is obtained.

We claim:
1. A method for the preparation of perfluoro(N-methylpyrrolidine) which consists in heating undecafluoropiperidine in a reaction vessel having an inert inner surface to a temperature of from 200° C. to 900° C., and under a pressure of from about 500 mm. Hg absolute to 10 atmospheres absolute, in the presence of an inert gas, and recovering perfluoro(N-methylpyrrolidine) from the reaction product.
2. A method in accordance with claim 1 in which the reaction is carried out at a temperature of from 450° to 650° C. and at a pressure of from one to three atmospheres absolute.

References Cited by the Examiner
UNITED STATES PATENTS
2,631,151  3/1953  Kauck et al. _____ 260—293

OTHER REFERENCES
Banks et al.: Jour. Chem. Soc., Part 3, 1962, pages 3407–3416.

Burdon et al.: Nature, vol. 186, pp. 231–232, April 16, 1960.

Sidgwick: The Organic Chemistry of Nitrogen, Oxford University Press, Oxford, 1937, pages 468–473.

NICHOLAS S. RIZZO, *Primary Examiner.*